April 3, 1951     R. G. MORRIS     2,547,592
EASY EEL HOLDER
Filed Jan. 28, 1947
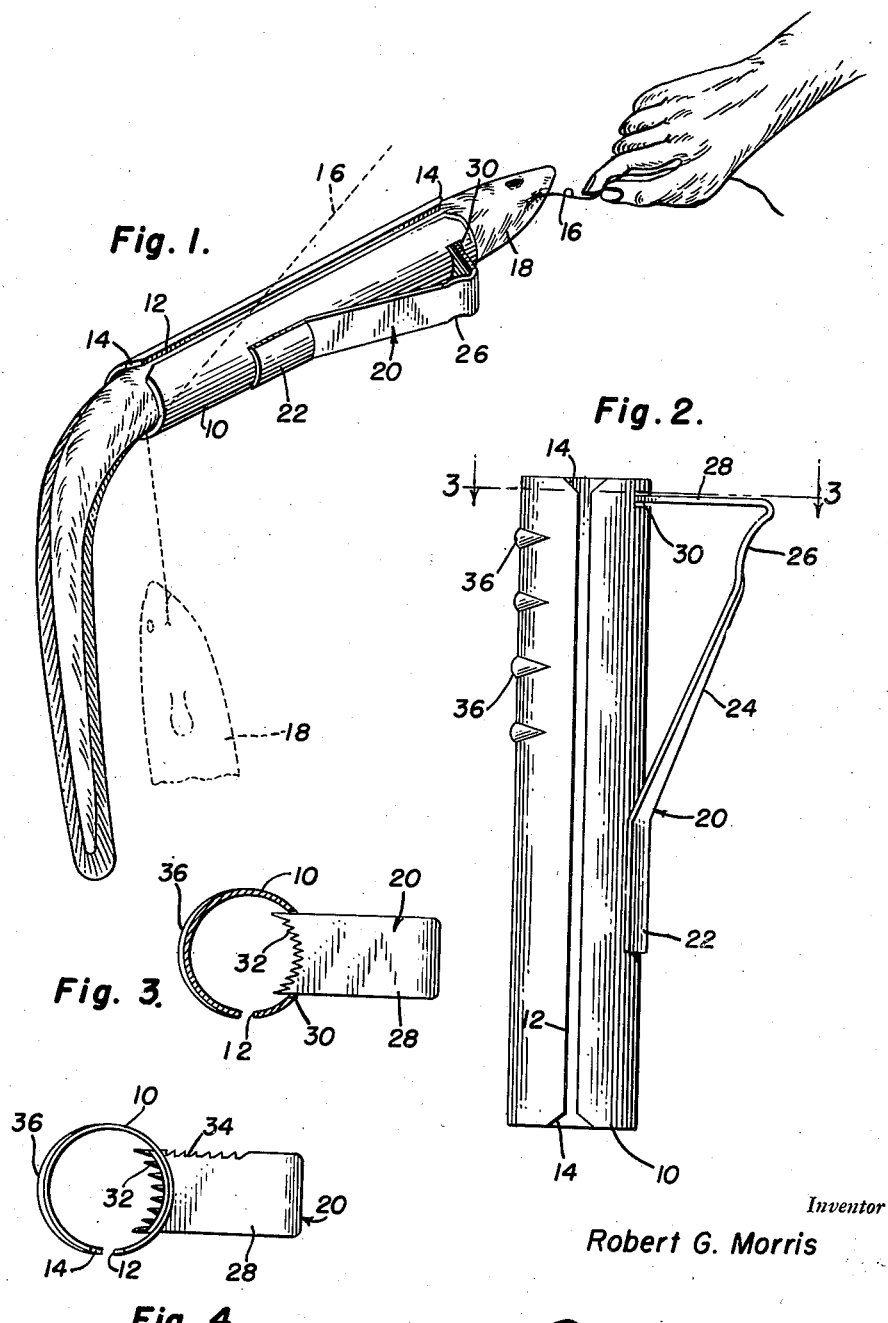
Inventor
Robert G. Morris Patented Apr. 3, 1951

2,547,592

UNITED STATES PATENT OFFICE 2,547,592

EASY EEL HOLDER

Robert G. Morris, Baltimore, Md.

Application January 28, 1947, Serial No. 724,822

4 Claims. (Cl. 43—53.5)

This invention appertains to new and useful improvements in fishermen's articles and has for its general object the provision of a device for grasping and retaining eels during the removal of a conventional fish hook therefrom.

Another object of this invention is to provide means for receiving a fishing line therethrough.

A further object of this invention is to provide a resilient clamping means for engaging a predetermined portion of an eel and urging said eel to open his mouth thereby rendering the removal of a fish hook relatively easy.

A still further object of this invention is to provide a specific eel engaging means at the end of said resilient clamping means.

A still further object of this invention is to provide a latching means on said resilient means for securing said resilient means in a predetermined selected position.

Another object of this invention is to provide means for easily and conveniently grasping said resilient means and the tubular body member forming part of the present invention.

A still further object of this invention is to provide a simple and efficient device which is both inexpensive and durable, lending itself well to commercial manufacture and conventional shop practices.

Ancillary objects and features of novelty shall become apparent to those skilled in the art in following the description of the illustrated preferred embodiment of the present invention, depicted in the accompanying drawings wherein:

Figure 1 is a perspective view of the preferred form of the present invention, showing said preferred form in operation;

Figure 2 is an elevational side view of the invention disclosed in Figure 1;

Figure 3 is a transverse sectional view of the invention disclosed in Figure 2 taken substantially on the line 3—3 thereof and in the direction of the arrows, and Figure 4 is a plan view of a second preferred embodiment of the instant invention.

Referring now in detail to the illustrated preferred embodiment of the present invention, like reference characters are used throughout to indicate similar elements in the views thereof.

Not infrequently certain undesirable fish are caught during normal fishing operations. Among these undesirable fish, there is quite a variety of eels. Accordingly, this device has been developed to retain an eel in a convenient manner, to project a member into said eel (or against said eel if so desired) in order to urge the eel to open his mouth thereby rendering the removal of a fish hook therefrom easy and relatively convenient. Upon the removal of said fish hook, the said eel may be conveniently and easily dropped from the device.

A tubular body member 10 is provided with a longitudinal slot 12 extending the length thereof and having outwardly flared portions 14 at its ends forming guide means for leading a fish line 16 therein.

Many materials of construction may be used including commercial plastics or metals, if metals are used it is preferable that a rust resistant metal such as aluminum, dural or the like be employed. It is apparent from an inspection of Figure 1, that an eel 18 is adapted to be received in the said body member 10 by leading the head thereof thereinto through the medium of pulling the said line 16 through the slot 12 thence through the tubular member itself.

An eel engaging means is suitably secured, as by welding, gluing or riveting to the exterior of the tubular member 10. This eel engaging means comprises a resilient strap 20 having a portion 22 of a configuration complemental to the exterior of said tubular member. The said portion 22 is secured in fixed relation on said tubular member and an upwardly extending portion 24 is angularly inclined relative to the said tubular member 10. A suitable thumb portion 26 may be provided on said inclined portion 24. At the free end of the upwardly extending portion is an extension 28 which is located in substantially perpendicular relation relative to the longitudinal axis of the said tube 10. An aperture 30 is provided in said tubular member and receives the said extension 28 therethrough. The resilient member is so located that a plane including the longitudinal axis of the portion 22 and the longitudinal axis of the extension 28 is parallel to the longitudinal axis of the slot.

A plurality of prongs 32 are provided on the end of said extension 28 and are adapted to engage a portion of the eel 18 adjacent the head thereof. It is readily apparent that the said eel 18 is urged against a wall of said tubular member and the prongs 32 engage the eel's body. It has been found that when an eel is subjected to this treatment, said eel opens his mouth and the fish hook may be relatively easily removed.

The embodiment shown in Figure 4 displays a locking means which may be utilized if so desired. This locking means comprises a plurality of ratchet teeth 34 on a selected edge of the extension 28 and said ratchet teeth are adapted to engage the wall of the aperture 30 thereby holding the eel engaging prongs against the body of the eel. The operation of said locking means is deemed quite apparent in that the inherent resiliency of the eel engaging means 20 is utilized in twisting the extension 28 to a slight degree of angularity or skew. This inherent resiliency is also utilized in returning the said extension 28 from the eel engaging position to the outwardly extended position as disclosed in Figures 3 and 4. It is here noted that it is within the contemplation of this invention to utilize certain other selected configured prongs other than those disclosed at 32.

Convenient finger grips 36 are provided on the exterior wall of the said tubular member 10. By this construction, the eel holder may be easily grasped in one hand, leaving the other hand free to remove the fish hook from said eel's mouth.

It can be seen that a fisherman's article has been fully described herein above and it is apparent that a device of extreme simplicity is characterized therein which can be easily received in a conventional fishing tackle box. Due to the extreme simplicity characterizing this invention, a further description thereof is deemed unnecessary. However, it is apparent to those skilled in the art, that variations including changes as to size and shape, omissions or additions may be made herein without departing from the spirit of the invention. Accordingly, limitation is sought only in accordance with the scope of the following claims.

Having thus described the instant invention what is claimed as novel and improved is as follows:

1. A device for dislodging fish hooks from eels comprising a tube having a longitudinal slot for reception of a fish line, and a resilient member fixed at one end to the exterior of said tube and having an extension at the opposite end disposed at substantially right angles to the longitudinal axis of said tube, said tube having a lateral opening in the path of movement of said extension for passage of said extension through said opening and into said tube, the end of said extension having eel engaging means to press an eel against the wall of the tube opposite said opening, a plane including the longitudinal axis of a portion of the resilient member fixed to the tube and the longitudinal axis of the extension being parallel to the longitudinal axis of the slot.

2. A device for dislodging fish hooks from eels comprising a tube having a longitudinal slot for reception of a fish line, and a resilient strap fixed at one end to the exterior surface of said tube, said resilient strap extending in non-parallel relation with respect to said tube and having an extension at the opposite end disposed at substantially right angles with relation to said tube, said tube having a lateral opening in the line of travel of said extension and having said extension passed therethrough when the resilient flat strap is manually pressed toward said tube, the end of said extension and the interior surface of the tube wall opposite said opening cooperating to form eel gripping jaws, a plane including the longitudinal axis of a portion of the resilient member fixed to the tube and the longitudinal axis of the extension being parallel to the longitudinal axis of the slot.

3. A device for dislodging fish hooks from eels comprising a tube with a longitudinal slot to pass a fish line therethrough, finger grips being formed on the outside of said tube near one end of said tube, and a resilient member fixed at one end to the exterior surface of said tube and having an extension at the opposite end, said resilient member being spaced from said tube in the region of the inception of said extension, said tube having a lateral opening with said extension passed therethrough, a thumb grip in said resilient member and located at the inception of said extension so that said tube may be held by said finger grips while the resilient member is actuated by the thumb grip, the inner end of said extension and the inner wall of said tube opposite said opening cooperating to form jaws for squeezing an eel to induce it to open its mouth.

4. The combination of claim 3, and said extension having a locking device formed thereon which cooperates with a part of said tube defining the lateral opening in said tube for holding said extension releasably in selected positions with respect to the bore of said tube.

ROBERT G. MORRIS.

REFERENCES CITED

The following references are of record in the file of this patent:

UNITED STATES PATENTS

| Number | Name | Date |
|---|---|---|
| 387,650 | Lovejoy | Aug. 14, 1888 |
| 774,208 | Stratton | Nov. 8, 1904 |
| 892,540 | McComb | July 7, 1908 |
| 1,322,956 | Ruff | Nov. 25, 1919 |
| 2,091,458 | Sleight | Aug. 31, 1937 |
| 2,152,385 | Mayer et al. | Mar. 28, 1939 |

FOREIGN PATENTS

| Number | Country | Date |
|---|---|---|
| 262,202 | Germany | July 9, 1913 |
| 513,628 | Germany | Dec. 2, 1930 |